US012642279B2

(12) United States Patent
Dietz et al.

(10) Patent No.: US 12,642,279 B2
(45) Date of Patent: Jun. 2, 2026

(54) PACKAGED PRESLICED READY-TO-EAT MEAT PRODUCTS AND METHODS THEREOF

(71) Applicant: Cargill, Incorporated, Wayzata, MN (US)

(72) Inventors: Garret Dietz, Mount Hope, KS (US); John Middleton, Udall, KS (US); Jonathan Patrick Paul, Wayzata, MN (US)

(73) Assignee: Cargill, Incorporated, Wayzata, MN (US)

( * ) Notice: Subject to any disclaimer, the term of this patent is extended or adjusted under 35 U.S.C. 154(b) by 922 days.

(21) Appl. No.: 17/759,675

(22) PCT Filed: Jan. 27, 2021

(86) PCT No.: PCT/US2021/015174
§ 371 (c)(1),
(2) Date: Jul. 28, 2022

(87) PCT Pub. No.: WO2021/154776
PCT Pub. Date: Aug. 5, 2021

(65) Prior Publication Data
US 2023/0337690 A1 Oct. 26, 2023

Related U.S. Application Data

(60) Provisional application No. 62/966,745, filed on Jan. 28, 2020.

(51) Int. Cl.
| | |
|---|---|
| *A23B 2/721* | (2025.01) |
| *A23B 4/16* | (2006.01) |
| *B65B 25/06* | (2006.01) |
| *B65D 65/40* | (2006.01) |
| *B65D 81/20* | (2006.01) |

(52) U.S. Cl.
CPC ............... *A23B 4/16* (2013.01); *A23B 2/721* (2025.01); *B65B 25/067* (2013.01); *B65D 65/40* (2013.01); *B65D 81/2023* (2013.01); *B65D 81/2084* (2013.01); *B65D 2251/20* (2013.01)

(58) Field of Classification Search
CPC .. A23B 4/16; A23B 4/09; A23B 2/708; A23B 2/721; B65B 25/06; B65B 25/065; B32B 2439/70; B32B 2307/412; B32B 2307/7244; B32B 2307/7246; B32B 2307/7376
USPC ..................... 428/34.1–36.92, 347, 516, 520
See application file for complete search history.

(56) References Cited

U.S. PATENT DOCUMENTS

| | | | | |
|---|---|---|---|---|
| 2,810,944 | A | 10/1957 | Sander | |
| 3,220,854 | A * | 11/1965 | Zwart | A23B 4/325 |
| | | | | 426/641 |
| 3,459,117 | A * | 8/1969 | Koch | B65B 25/067 |
| | | | | 206/0.5 |
| 4,360,551 | A | 11/1982 | Guarino | |
| 5,138,750 | A | 8/1992 | Gundlach et al. | |
| 5,372,428 | A | 12/1994 | Bruno et al. | |
| 6,004,032 | A | 12/1999 | Kapperman et al. | |
| 6,025,079 | A * | 2/2000 | Ciocca | B32B 27/32 |
| | | | | 428/521 |
| 6,113,962 | A * | 9/2000 | Spencer | A23B 4/09 |
| | | | | 426/324 |
| 6,749,910 | B1 * | 6/2004 | Georgelos | B65D 77/04 |
| | | | | 426/106 |
| 7,029,178 | B2 | 4/2006 | Gzybowski | |
| 7,935,373 | B2 | 5/2011 | Brackenridge | |
| 8,053,047 | B2 | 11/2011 | Siegel | |
| 8,158,176 | B2 | 4/2012 | Steiner | |
| 8,314,286 | B2 | 11/2012 | Drzewiecki et al. | |
| 8,357,414 | B2 | 1/2013 | Becraft | |
| 8,709,595 | B2 | 4/2014 | Siegel | |
| 8,741,433 | B2 | 6/2014 | Schell | |
| 10,172,366 | B2 * | 1/2019 | Huebner | B65D 75/32 |
| 10,618,260 | B2 * | 4/2020 | Peiffer | B65D 81/343 |
| 2003/0054073 | A1 * | 3/2003 | DelDuca | A23L 13/00 |
| | | | | 426/124 |
| 2006/0073244 | A1 * | 4/2006 | Brackenridge | A23B 4/16 |
| | | | | 426/129 |
| 2006/0147586 | A1 | 7/2006 | Tewari | |

(Continued)

FOREIGN PATENT DOCUMENTS

| | | |
|---|---|---|
| AU | 2018247919 A1 | 10/2019 |
| CN | 1993053 A | 7/2007 |

(Continued)

OTHER PUBLICATIONS

"Water Vapor Transmission Rate", PolyPrint, webpage, accessed online Oct. 15, 2025, https://www.polyprint.com/understanding-film-properties/flexographic-wvtr/ (Year: 2025).*

(Continued)

*Primary Examiner* — Michael C. Romanowski

(57) ABSTRACT

Sliced ready-to-eat meat are provided by slicing ready-to-eat meat, disposing the meat into a flexible pouch with a modified atmosphere, and sealing the flexible pouch containing the meat. The flexible pouch is formed from material having: i) a thickness of from about 0.2 mils to about 2 mils; ii) an MVTR of about 1.2 g/100 in²/24 Hrs @ 100° F., 90% RH, 1 atm or less; iii) an O2 Gas Transmission Rate of about 0.8 cc/100 sqin/day or less at 1 atmosphere, 0% relative humidity and 73° F. or less; and iv) a clarity of about 80% or greater.

19 Claims, No Drawings

(56) References Cited

U.S. PATENT DOCUMENTS

| | | | | |
|---|---|---|---|---|
| 2006/0233985 | A1 | 10/2006 | Pockat | |
| 2006/0286323 | A1 | 12/2006 | Siegel | |
| 2007/0275134 | A1 * | 11/2007 | Siegel | B32B 27/308 |
| | | | | 428/34.9 |
| 2007/0298273 | A1 * | 12/2007 | Thies | C08L 23/0869 |
| | | | | 428/522 |
| 2009/0092717 | A1 | 4/2009 | Steiner | |
| 2009/0130276 | A1 * | 5/2009 | Voisin | B32B 27/36 |
| | | | | 426/523 |
| 2016/0114958 | A1 * | 4/2016 | Busche | B65D 81/28 |
| | | | | 424/78.29 |
| 2016/0152390 | A1 | 6/2016 | Itoh | |
| 2019/0375200 | A1 * | 12/2019 | Kitada | B32B 27/308 |

FOREIGN PATENT DOCUMENTS

| | | | | |
|---|---|---|---|---|
| CN | 102599228 | A | 7/2012 | |
| EP | 0118314 | A1 * | 9/1984 | A22C 17/0033 |
| EP | 0118314 | B1 | 12/1986 | |
| EP | 2055651 | A1 * | 5/2009 | B65D 75/305 |
| EP | 3470344 | A1 * | 4/2019 | B65D 33/20 |
| WO | 2005/122774 | A2 | 12/2005 | |
| WO | 2015/002963 | A1 | 1/2015 | |
| WO | 2015189351 | A1 | 12/2015 | |
| WO | 2018185235 | A1 | 10/2018 | |
| WO | WO-2019002107 | A1 * | 1/2019 | B32B 27/34 |
| WO | 2021076763 | | 4/2021 | |

OTHER PUBLICATIONS

"Oxygen Transmission Rate", PolyPrint, webpage, accessed online Oct. 15, 2025, https://www.polyprint.com/understanding-film-properties/flexographic-otr/ (Year: 2025).*

Mintel; Mar. 24, 2011 (Mar. 24, 2011), anonymous: "Parma Ham", XP055800352, Database accession No. 1512997, pp. 1-2 (Database GNPD, online) (Year: 2011).*

International Search Report and Written Opinion for Application No. PCT/US2021/015174, mailed May 18, 2021, 14 pages. This application is the US national phase of that PCT application.

Database FSTA [online] International Food Information Service (IFIS), Frankfurt-Main, DE; 2017, Salzgeber C: "well-packaged quickly sold." XP002802859, Database accession No. FS-2017-09-Sa3616 abstract.

Database GNPD [online] Mintel; Mar. 24, 2011 (Mar. 24, 2011), anonymous: "Parma Ham", XP055800352, Database accession No. 1512997 p. 1-p. 2.

Yancey J.W. S. et atl., Cookery method and end-point temperature can affect the Warner Bratzler shear force, cooking loss, and internal cooked color of beefsteaks, Meat Science, Elsevier Science, GB, vol. 88, No. 1, Nov. 20, 2010 (Nov. 20, 2010), pp. 1-7.

American Meat Science Association, "AMSA Meat Color Measurement Guidelines, Beef Steak Color Guide—Degrees of Doneness", p. 103, https://meatscience.org/docs/default-source/publications-resources/hottopics/2012_12_meat_clr_guide.pdf, Dec. 2012 (Dec. 2012).

Farber, J. M., "Microbiological Aspects of Modified-Atmosphere Packaging Technology—A Review", Journal of Food Protection, vol. 54. No. 1, Jan. 1991, pp. 58-70.

GBPI Testing Instruments, "WVTR and OTR testing, the key for choosing a suitable packaging film", retrieved from the Internet: <URL: https://www.gbpitester.com/blog/wvtr-and-otr-testing-the-keyfor- choosing-a-suitable-packaging-film_b6>, Feb. 21, 2019, 3 pages.

Hintlian, C. B. et al., "Comparative Growth of Spoilage and Pathogenic Organisms on Modified Atmosphere-Packaged Cooked Beef", Journal of Food Protection, vol. 50, No. 3, Mar. 1, 1987, pp. 218-223.

John, L. et al., "Color and thiobarbituric acid values of cooked top sirloin steaks packaged in modified atmospheres of 80% oxygen, or 0.4% carbon monoxide, or vacuum", Meat Science, vol. 69, No. 3, Mar. 1, 2005, pp. 441-449.

Kantor, L. S. et al., "Estimating and Addressing America's Food Losses" Food Review, Jan.-Apr. 1997, pp. 1-11.

Stable Micro Systems, "How to Measure Flexibility and Bending Force", retrieved from the Internet: <URL: https://web.archive.org/web/20210801110434/https://stablemicrosystems.com/measure-material-flexibility.html>, 2020, 4 pages.

The Interagency Retail Listeria monocytogenes Risk Assessment Workgroup, USDA, "Interagency Risk Assessment: Listeria monocytogenes in Retail Delicatessens" retrieved from the Internet: <https://www.fsis.usda.gov/wps/wcm/connect/c0c6dfbc-ad83-47c1-bcb8-8db6583f762b/Lm-Retail-Technical-Report.pdf?MOD=AJPERES>, Sep. 2013, 175 pages.

U.S. Department of Agriculture (USDA), "Food Waste FAQs" retrieved from the Internet: <URL: https:/www.usda.gov/foodwaste/faqs>, May 18, 2022, 5 pages.

USDA Food Safety and Inspection Service, "Color of Cooked Ground Beef as It Relates to Doneness", retrieved from the Internet: <URL: https://www.fsis.usda.gov/food-safety/safe-food-handling-andpreparation/ meat-fish/color-cooked-ground-beef-it-relates> retrieved on Sep. 6, 2019, 4 pages.

http://lib3.dss.go.th/fulltext/scan_ebookj.food_pre_1987_V11-n2.pdf Journal of Food Processing and Preservation vol. 11 No. 2 pp. 171-179 Hintlian et al Microbiological and Sensory Evaluation of Cooked Roast Beef Packaged in a Modified Atmosphere (Year: 1987).

* cited by examiner

PACKAGED PRESLICED READY-TO-EAT MEAT PRODUCTS AND METHODS THEREOF

CROSS REFERENCE TO RELATED APPLICATIONS

This application is a national phase application of PCT/US2021/015174, filed 27 Jan. 2021, entitled PACKAGED PRESLICED READY-TO-EAT MEAT PRODUCTS AND METHODS which claims the benefit of U.S. Provisional Patent Application No. 62/966,745, filed 28 Jan. 2020, entitled METHOD FOR STORING AND SHIPPING SLICED READY-TO-EAT MEAT which are hereby incorporated by reference in their entirety.

FIELD

The present invention relates to packaged presliced ready-to-eat meat products, and methods of providing such products.

BACKGROUND

Sliced meat products, such as ham, turkey and fully cooked beef have long been provided in prepackaged form for sale to consumers in grocery stores and the like. Such products often are sold in lidded tray packages that provide a rigid container for a robust packaging system. Such packaging may optionally be hermetically sealed and may even include a modified atmosphere in order to extend shelf life. The modified atmosphere most often includes a gas mixture of carbon dioxide, and nitrogen, or of carbon monoxide, carbon dioxide, and nitrogen. See, for example, Farber, "Microbiological Aspects of Modified-Atmosphere Packaging Technology—a Review," Journal of Food Protection. Vol. 54. No. I. Pages 58-70 (January 1991).

SUMMARY

The prepackaged meats as described above are generally not considered to be high quality, premium sliced meat products. In particular, such meats typically are considered to be of ordinary quality. Additionally such meats may contain preservatives that some customers would prefer to avoid, but which provide the conventional, pre-packaged sliced meats available from refrigerated display cases with an extended shelf life of up to 55 to 90 days. Where prepackaged meats are advertised as premium sliced meat products, they are provided in robust packaging materials and hermetically sealed.

Meanwhile, high quality sliced, ready-to-eat (i.e. already cooked, cooked and cured, or cured) meat products are conventionally provided in staffed meat outlets, such as butcher shops and deli counters, where the meat is provided to the outlet as sub-primal or large portion cuts that are further sliced by on-site human attendants according to the specific request of the customer. However, time has become a scarce commodity, and there is a great desire to obtain high quality, premium sliced meat products without waiting for extended periods of time at the deli counter.

The present invention makes it possible for the customer to obtain a shopping experience that is equivalent to the deli counter experience, while bypassing the inconvenience experienced by delay at the counter. The shopper can quickly select high quality sliced, ready-to-eat meats having an acceptable shelf life from the display case.

In an aspect, a method for providing sliced ready-to-eat meat comprises slicing ready-to-eat meat in slices having a thickness of from about 0.5 to 10 mm to provide sliced ready-to-eat meat. The sliced ready-to-eat meat is disposed into a flexible pouch component, which is flushed with a modified atmosphere comprising an inert gas and sealed to provide a sealed flexible pouch containing the sliced ready-to-eat meat and the inert gas. The flexible pouch is formed from a material having:

i) a thickness of from about 0.2 mils to about 2 mils;
   ii) an MVTR of about 1.2 g/100 in$^2$/24 Hrs @100° F., 90% RH, 1 atm or less;
   iii) an O2 Gas Transmission Rate of about 0.8 cc/100 sqin/day at 0.8 atmosphere, 0% relative humidity and 73° F. or less; and
   iv) a clarity of about 80% or greater.

In an aspect, a packaged sliced ready-to-eat meat product comprises ready-to-eat meat in slices having a thickness of from about 0.5 to 10 mm and a modified atmosphere comprising an inert gas disposed in a sealed flexible pouch. The flexible pouch is formed from a film material having:

i) a thickness of from about 0.2 mils to about 2 mils;
   ii) an MVTR of about 1.2 g/100 in$^2$/24 Hrs @100° F., 90% RH, 1 atm or less;
   iii) an O2 Gas Transmission Rate of about 0.8 cc/100 sqin/day at 0.8 atmosphere, 0% relative humidity and 73° F. or less; and
   iv) a clarity of about 80% or greater.

The present method and product may afford a number of benefits. In an aspect of the present method, manufacturing efficiencies can be achieved through large scale production of sliced ready-to-eat meats at a centralized production facility. High quality, premium sliced meats can be provided without the loss of productivity, product waste, and variation of sanitation standards that are inevitable from a decentralized and local slicing and packaging operations. In particular, it is noted that carrying out the slicing and packaging operations in a large scale production facility provides significant safety benefits. Smaller scale deli operations are prone to a high incidence of injuries, particularly in the form of cuts or other physical injuries in opening packages, lifting heavy materials, and handling sharp cutting implements. A large scale production facility, in contrast, is able to use automation and "hands-free" processes that greatly minimize occurrence of injury. In an aspect of the present method, distribution efficiencies can be achieved by providing packaged sliced ready-to-eat meat products as described herein, which are ready for stocking into refrigerated cases at points-of-sale. These packages can be unloaded into the display case at a store by stocking personnel, rather than requiring the attention of persons skilled in the handling of meat products. Moreover, the supplier can assure consistent product appearance and quality through the delivery of uniformly assembled and handled display-ready packages.

It has been found that placing high quality meat slices in flexible pouches exhibiting the characteristics of flexibility, MVTR, O$_2$ Gas Transmission and clarity provide the ultimate consumer with the experience of obtaining a product that delivers a deli counter quality experience, while at the same time providing the convenience of a self-service display case in a supermarket, large scale retailer or convenience store.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

The meat to be prepared as ready-to-eat meat may be any meat that is cooked or cured, and suitable for such use. Suitable meats include those obtained from bovine, porcine, equine, caprine, ovine, avian animals, or any animal commonly slaughtered for food production. Bovine animals may include, but are not limited to, buffalo, and all cattle, including steers, heifers, cows, and bulls. Porcine animals may include, but are not limited to, feeder pigs and breeding pigs, including sows, gilts, barrows, and boars. Ovine animals may include, but are not limited to, sheep, including ewes, rams, wethers, and lambs. Poultry may include, but are not limited to, chicken, turkey, and ostrich. In an aspect, the meat is selected from pork, ham, turkey, beef, and chicken. In an aspect, the meat is a sausage meat comprising one or more of the above meats. In an aspect, the meat is selected from only pork, ham, turkey, and chicken, and is not beef.

In an aspect, the ready-to-eat meat has been prepared by cooking, such as by roasting, baking or grilling. In an aspect, the ready-to-eat meat has been prepared by curing, such as by addition of a curing material, such as salt, nitrates, nitrites, or sugar. In an aspect, the preparation of the ready-to-eat meat comprises smoking or added spices to the meat.

In an aspect, the ready-to-eat meat is antibiotic-free. In an aspect, the ready-to-eat meat is free of sodium nitrite and sodium nitrate. In an aspect, the ready-to-eat meat is free of added artificial colors, flavors and phosphates. In an aspect, the ready-to-eat meat is free of artificial preservatives. In an aspect, the ready-to-eat meat is free of artificial ingredients.

The ready-to-eat meat is sliced in slice thicknesses of from about 0.5 to about 10 mm. In an aspect, the meat is sliced in slice thicknesses of from about 0.5 mm to about 5 mm, or from about 1 mm to about 5 mm, or from about 2 mm to about 4 mm. In an aspect, the meat slices have a major surface area of from about 60 mm$^2$ to about 225 mm$^2$. In an aspect, the meat slices have a major surface area of from about 80 mm$^2$ to about 180 mm$^2$.

In an aspect, the ready-to-eat meat is conditioned prior to slicing by any combination of grinding, injecting, macerating, mixing, tumbling, massaging, or stuffing. In an aspect, the meat preparations steps, such as macerating or grinding, are carried out to only to the extent desired for conditioning of the meat while substantially maintaining the muscle structure in order to maintain final product cohesive texture properties.

The sliced ready-to-eat meat is disposed into flexible pouch components that are sealed to provide a sealed flexible pouch containing the sliced ready-to-eat meat and the inert gas. These sealed flexible pouches are ready to be placed in display cases, and so can be referred to as sealed flexible pouches. In an aspect, each sealed flexible pouch comprises from about 50 to about 1000 grams of sliced ready-to-eat meat. In an aspect, each sealed flexible pouch comprises from about 60 to about 500 grams of sliced ready-to-eat meat. In an aspect, each sealed flexible pouch comprises from about 80 to about 400 grams of sliced ready-to-eat meat. In an aspect, each sealed flexible pouch comprises from about 90 to about 300 grams of sliced ready-to-eat meat. In an aspect, each sealed flexible pouch comprises from about 100 to about 200 grams of sliced ready-to-eat meat.

In an aspect, the sliced ready-to-eat meat is disposed into the flexible pouch component by depositing the sliced meat into a flexible pouch component that is a pouch formed from two film sheets that are sealed to each other on three sides to form a pouch with an open top. In this aspect, the sliced ready-to-eat meat is deposited into the open end of the pouch, the flexible pouch component is flushed with a modified atmosphere comprising an inert gas and the top is sealed to provide a sealed flexible pouch containing the sliced ready-to-eat meat and the inert gas.

In an aspect, the sliced ready-to-eat meat is disposed into the flexible pouch component by depositing the sliced meat into a flexible pouch component that is pouch formed from seamless tubing that is sealed on the bottom to provide a pouch with an open top. In this aspect, the sliced ready-to-eat meat is deposited into the open end of the pouch, the flexible pouch component is flushed with a modified atmosphere comprising an inert gas and the top is sealed to provide a sealed flexible pouch containing the sliced ready-to-eat meat and the inert gas.

In an aspect, the sliced ready-to-eat meat is disposed into the flexible pouch component by depositing the sliced meat into a flexible pouch component that is a flat bottom film, and the pouch is further assembled by applying a top film sheet over the bottom film sheet and the meat, and sealing the top film sheet to the bottom film sheet while flushing with a modified atmosphere comprising an inert gas to provide a sealed flexible pouch containing the sliced ready-to-eat meat and the inert gas.

In an aspect, the sealed flexible pouches are made from a polymeric material having a thickness of from about 0.2 mils to about 2 mils, or from about 0.2 mils to about 1.8 mils, or from about 0.2 to about 1.6 mils. In an aspect, the polymeric material is a multilayer film.

It has been found using films of this thickness provides the customer with a tactile experience that conveys the message that the sliced meat product being received is a high quality meat product akin to that delivered at a deli counter. The combination of this tactile experience, together with satisfying the stringent package performance requirements of MTVR, O2 Gas Transmission Rate and clarity as discussed in more detail below, provides a unique product that both communicates an expectation of quality during initial product impression and delivers on that quality expectation by presentation of an excellent meat product by storage in packaging that meets high MTVR and O2 Gas Transmission Rate requirements.

In an aspect, the flexible pouch is formed from a material that has a Gurley stiffness of 500 or less in milligrams (mg) force in each of its machine direction and transverse direction. In an aspect, the flexible pouch is formed from a material that has a Gurley stiffness of 400 or less in milligrams (mg) force in each of its machine direction and transverse direction. In an aspect, the flexible pouch is formed from a material that has a Gurley stiffness of 300 or less in milligrams (mg) force in each of its machine direction and transverse direction. In an aspect, the flexible pouch is formed from a material that has a Gurley stiffness of 200 or less in milligrams (mg) force in each of its machine direction and transverse direction. In an aspect, the flexible pouch is formed from a material that has a Gurley stiffness of 100 or less in milligrams (mg) force in each of its machine direction and transverse direction.

A standard test method for determining the flexibility values described herein is a Gurley Stiffness test, a description of which is set forth in TAPPI Standard Test T 543 and ASTM D 6125-97. A suitable testing apparatus is a Gurley Digital Stiffness Tester: Model 4171DS1N manufactured by Teledyne Gurley (514 Fulton Street, Troy, N.Y. 12181-0088). This instrument allows the testing of a wide variety of materials through the use of various lengths and widths in combination with the use of a 5, 25, 50, or 200 gram weight placed in one of three positions on the pointer of the apparatus.

As noted above, the flexible pouch is formed from a material having a moisture vapor transmission rate (MVTR) of about 1.2 g/100 in$^2$/24 Hrs @100° F., 90% RH, 1 atm or less. In aspect, the flexible pouch is formed from a material having a moisture vapor transmission rate (MVTR) of about 1 g/100 in$^2$/24 Hrs @100° F., 90% RH, 1 atm or less. the flexible pouch is formed from a material having a moisture vapor transmission rate (MVTR) of about 0.8 g/100 in$^2$/24 Hrs @100° F., 90% RH, 1 atm or less.

For purposes of the present discussion, the Moisture Vapor Transmission Rate (MVTR) is determined by the methodology of ASTM F1249.

As noted above, the flexible pouch is formed from a material having an O$_2$ Gas Transmission Rate of about 0.8 cc/100 sqin/day or less at 1 atmosphere, 0% relative humidity and 73° F. In aspect, the flexible pouch is formed from a material having an O$_2$ Gas Transmission Rate of about 0.6 cc/100 sqin/day or less at 0.8 atmosphere, 0% relative humidity and 73° F. In aspect, the flexible pouch is formed from a material having an O$_2$ Gas Transmission Rate of about 0.4 cc/100 sqin/day or less at 1 atmosphere, 0% relative humidity and 73° F.

For purposes of the present discussion, the Oxygen Gas Transmission Rate (O$_2$ GTR) is determined by ASTM F1927.

As noted above, the flexible pouch is formed from a material having a clarity value of about 80% or greater. In aspect, the flexible pouch is formed from a material having a clarity value of from about 80% to about 98%. In aspect, the flexible pouch is formed from a material having a clarity value of from about 85% to about 90%.

For purposes of the present discussion, the clarity of the film is measured in accordance with ASTM D-1003 test method.

In an aspect, the flexible pouch is formed from a material having a haze value of less than 4%. For purposes of the present discussion, the haze value of the film is measured in accordance with ASTM D-1003 test method.

In an aspect, the flexible pouch is formed from a material that is a multilayer film comprising an oxygen barrier layer. In an aspect the oxygen barrier layer is made from a material comprising EVOH, PVDC, PVOH, nylon, polyimide, nano-composite, polyester, polyacrylonitrile or a combination thereof.

In an aspect, the flexible pouch is formed from a material that is a multilayer film comprising a heat seal layer. In an aspect the heat seal layer is made from a material comprising EVA, an ionomer or a combination thereof.

In an aspect, the flexible pouch is formed from a material that is a multilayer film comprising a moisture barrier layer. In an aspect, the moisture barrier layer comprises EVOH, nylon or a combination thereof.

In an aspect, the flexible pouch is formed from material components and identified by testing methodologies as described in U.S. Pat. Nos. 8,053,047; 8,709,595; and 8,741,433, and US Patent Application Publication No. 2007/0298273; the disclosures of which are incorporated herein by reference.

In an aspect, the step of disposing the sliced ready-to-eat meat into the flexible pouch component is facilitated by depositing the sliced meat onto a carrier sheet, with the meat and carrier sheet being deposited together into the flexible pouch component. In these aspects, the carrier sheet assists in conveying the sliced ready-to-eat meat in position in the package by providing a surface for receiving the sliced ready-to-eat meat, and a product configuration that is manipulatable by automated equipment. In an aspect, the carrier sheet is a coated or treated paper sheet. In an aspect, the carrier sheet is bleached (white) or unbleached (brown kraft) material or a kraft paper provided in a color other than white or brown. In an aspect, the carrier sheet comprises paper having a basis weight of from about 1 to 40 pounds per ream. In an aspect, the carrier sheet comprises paper coated with a wax. In an aspect, the carrier sheet comprises paper coated with a wax selected from paraffin or soy based blends of wax. In an aspect, the carrier sheet paper may be coated on one side, or coated on both sides, or the coating may be impregnated into the paper itself. In an aspect, the carrier sheet is made from a material that absorbs grease and/or liquids. In an aspect, the carrier sheet is made from a material that acts as a sanitary barrier for foods. In an aspect, the carrier sheet is made from a material that "hides" juices through absorption. In an aspect, the carrier sheet is tray component having a side that is not greater than 0.5 inches in height.

Prior to sealing the flexible pouch component to provide a sealed flexible pouch, the flexible pouch component is flushed with a modified atmosphere comprising an inert gas. In an aspect, the inert gas comprises at least one gas selected from carbon dioxide and nitrogen. In an aspect, the inert gas comprises from about 65 to about 85% Nitrogen and from about 15% to about 35% Carbon dioxide. In an aspect, the inert gas comprises 80% Nitrogen and 20% Carbon dioxide. In an aspect, the inert gas comprises 70% Nitrogen and 30% Carbon dioxide. In an aspect, the inert gas comprises at least one gas selected from carbon monoxide, carbon dioxide and nitrogen. In an aspect, the inert gas comprises carbon dioxide, nitrogen, and from about 0.1% to about 30% carbon monoxide. In an aspect, the carbon monoxide is present in an amount of from about 0.1% to about 2%; or wherein the carbon monoxide is present in an amount of from about 0.1% to about 1.5%; or wherein the carbon monoxide is present in an amount of from about 0.1% to about 1.0%; or wherein the carbon monoxide is present in an amount of from about 0.2% to about 0.5%. In an aspect, the inert gas comprises about 0.4% carbon monoxide, about 35% carbon dioxide, and about 64.6% nitrogen.

After having disposed the sliced ready-to-eat meat and the inert gas into the flexible pouch component, the pouch component is sealed to provide a sealed flexible pouch. The seal may be provided by any appropriate technique that will securely provide a sealed pouch having a MVTR of about 1.2 g/100 in$^2$/24 Hrs @100° F., 90% RH, 1 atm or less and an O2 Gas Transmission Rate of about 0.8 cc/100 sqin/day or less at 1 atmosphere, 0% relative humidity and 73° F. or less. In an aspect, the flexible pouch component is sealed by a heat seal. In an aspect the heat seal is from 1 mm to 12 mm wide. In an aspect the heat seal is from 2 mm to 8 mm wide. In an aspect the heat seal is from 3 mm to 5 mm wide.

In an aspect, the flexible pouch component is sealed by an adhesive seal. In an aspect the adhesive seal is from 1 mm to 12 mm wide. In an aspect the adhesive seal is from 2 mm to 8 mm wide. In an aspect the adhesive seal is from 3 mm to 5 mm wide.

In an aspect, the sealed flexible pouches comprise a removable oxygen and moisture vapor impermeable seal closure, and additionally comprise a resealable pouch closure inside the removable oxygen and moisture vapor impermeable seal closure. The resealable pouch closure may be used by the consumer after removing the removable oxygen and moisture vapor impermeable seal closure to securely store unused sliced ready-to-eat meat.

The removable oxygen and moisture vapor impermeable seal closure is a configured to be removed, for example, by providing a line of weakness to facilitate tearing away the oxygen and moisture vapor impermeable seal closure. Examples of lines of weakness include partial perforations, score lines or frangible portions that can be torn apart to gain access to the contents of the bags. An embodiment of this structure is described in U.S. Pat. No. 5,372,428 to Bruno et al. and U.S. Pat. No. 6,004,032 to Kapperman et al., the disclosures of which are incorporated herein by reference.

In an aspect, the resealable pouch closure comprises a one-way, zip-locking closure for a bag-type container having a mouth defined by opposed side panels, the one-way, zip-locking closure including: cooperating coupling structures on inner surfaces of the opposed side panels adjacent the mouth; a slider coupled to the cooperating coupling structures for closing the mouth of the bag-type container when slid in a first direction between a first position to a second position; a series of registration structures provided along at least one side of the mouth; a catch mechanism provided within the slider for engaging the series of registration structures and thereby preventing the slider from sliding in a second direction opposite the first direction. An embodiment of this structure is described in U.S. Pat. No. 7,029,178 to Gzybowski, the disclosure of which is incorporated herein by reference.

In an aspect, the resealable pouch closure comprises a closure structure having cooperating interlocking or coupling structures that are engaged together. Such a closure is operated by pressing the opposite sides of the mouth of the bag together. An embodiment of this structure is described in U.S. Pat. No. 5,138,750 to Gundlach et al., the disclosure of which is incorporated herein by reference.

In an aspect, the resealable pouch closure comprises a closure mechanism having a slider. Such a slider, which is slidably coupled to each of the opposite sides of the mouth of the bag, is configured so that as it is slid in one direction, it couples the cooperating interlocking or coupling structures of the mouth of the bag together. In contrast, as the slider is slid in the opposite direction, it uncouples the cooperating interlocking or coupling structures of the mouth of the bag. An embodiment of this structure is described in U.S. Pat. No. 2,810,944 to Sander, the disclosure of which is incorporated herein by reference.

In an aspect, the sealed flexible pouches do not contain a rigid packaging component. In this aspect, the sealed flexible pouch is completely flexible, and provides a particularly convincing sensory effect of obtaining a product from a deli counter, even though the product is prepared and packaged off site from the point of sale.

In an aspect, the sealed flexible pouch is from about 8 inches to 12 inches wide and from about 6 to about 12 inches in height (including any closure feature). In an aspect, the sealed flexible pouch is from about 9 inches to 1 inches wide and from about 8 to about 10 inches in height (including any closure feature).

After preparation of the sealed flexible pouches, the pouches are packaged for storage and eventual shipping to the retailer. In an aspect, from about 6 to about 100 sealed flexible pouches are placed in a suitable shipping container, such as a cardboard box or shipping crate. In an aspect, from about 20 to about 500 sealed flexible pouches are placed in a suitable shipping container. In an aspect, the sealed flexible pouches are placed in a gas impermeable master container (or "mother" bag) that itself is provided with a modified atmosphere for further protection of the sliced meat. Examples of such packaging systems are described, for example, in WO 2015/002963 and in U.S. Pat. No. 8,357, 414 to Becraft, the disclosures of which are incorporated by reference herein.

The thus prepared product is shipped to a retail customer under appropriate shipping conditions (e.g. temperature control) to a retail customer.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by $\frac{1}{10}$ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for providing sliced ready-to-eat meat comprising:
    a) slicing ready-to-eat meat in slices having a thickness of from about 0.5 to about 10 mm to provide sliced ready-to-eat meat;
    b) disposing the sliced ready-to-eat meat into a flexible pouch component;
    c) flushing the flexible pouch component with a modified atmosphere comprising an inert gas;

d) sealing the flexible pouch component to provide a sealed flexible pouch containing the sliced ready-to-eat meat and the inert gas; wherein the flexible pouch is formed from a polymeric multilayer film having:

i) a thickness of from about 0.2 mils to about 2 mils;

ii) a moisture vapor transmission rate (MVTR) of about 1.2 g/100 in²/24 Hrs at 100° F., 90% RH, and 1 atm or less;

iii) an $O_2$ Gas Transmission Rate of about 0.8 cc/100 sqin/day or less at 0.8 atmosphere, 0% relative humidity and 73° F.; and iv) a clarity of about 80% or greater.

2. The method of claim 1, wherein the polymeric multilayer film has:

i) a thickness of from about 0.2 mils to about 1.8 mils ii) an MVTR of about 1 g/100 in²/24 Hrs at 100° F., 90% RH, and 1 atm or less;

iii) an $O_2$ Gas Transmission Rate of about 0.6 cc/100 sqin/day or less at 0.8 atmosphere, 0% relative humidity and 73° F.; and iv) a clarity of from about 80% to about 98%.

3. The method of claim 1, wherein the polymeric multilayer film has:

i) a thickness of from about 0.2 mils to about 1.6 mils ii) an MVTR of about 0.8 g/100 in²/24 Hrs at 100° F., 90% RH, and 1 atm or less;

iii) an $O_2$ Gas Transmission Rate of about 0.4 cc/100 sqin/day or less at 0.8 atmosphere, 0% relative humidity and 73° F.; and iv) a clarity of from about 85% to about 90%.

4. The method of claim 1, wherein the polymeric multilayer film has: a Gurley stiffness of 500 or less in milligrams (mg) force in each of its machine direction and transverse direction.

5. The method of claim 1, wherein the polymeric multilayer film has a haze value of less than 4%.

6. The method of claim 1, wherein the polymeric multilayer film has a thickness of from about 0.2 mils to about 1.8 mils.

7. The method of claim 1, wherein the polymeric multilayer film has a moisture vapor transmission rate (MVTR) of about 1 g/100 in²/24 Hrs at 100° F., 90% RH, 1 atm or less.

8. The method of claim 1, wherein the polymeric multilayer film has an $O_2$ Gas Transmission Rate of about 0.6 cc/100 sqin/day or less at 0.8 atmosphere, 0% relative humidity and 73° F.

9. The method of claim 1, wherein the polymeric multilayer film has a clarity value of from about 80% to about 98%.

10. The method of claim 1, wherein the polymeric multilayer film comprises an oxygen barrier layer made from a material comprising EVOH, PVDC, PVOH, nylon, polyimide, nanocomposite, polyester, polyacrylonitrile or a combination thereof.

11. The method of claim 1, wherein the polymeric multilayer film comprises a heat seal layer made from a material comprising EVA, an ionomer or a combination thereof.

12. The method of claim 1, wherein the polymeric multilayer film comprises a moisture barrier layer comprising EVOH, nylon or a combination thereof.

13. The method of claim 1, wherein the flexible pouch is formed comprising a heat seal that is from 1 mm to 12 mm wide.

14. The method of claim 1, wherein the flexible pouch is formed comprising an adhesive seal that is from 1 mm to 12 mm wide.

15. The method of claim 1, wherein the flexible pouch comprises a removable oxygen and moisture vapor impermeable seal closure, and additionally comprises a resealable pouch closure inside the removable oxygen and moisture vapor impermeable seal closure.

16. The method of claim 1, wherein the inert gas comprises carbon dioxide and nitrogen; or wherein the inert gas comprises carbon dioxide, nitrogen, and from about 0.1% to about 30% carbon monoxide.

17. The method of claim 1, wherein from about 50 to about 1000 grams of sliced ready-to-eat meat are disposed in the flexible pouch component.

18. The method of claim 1, wherein the ready-to-eat meat is antibiotic-free; or wherein the ready-to-eat meat is free of sodium nitrite and sodium nitrate; or wherein the ready-to-eat meat is free of added artificial colors, flavors and phosphates; or wherein the ready-to-eat meat is free of artificial preservatives; or wherein the ready-to-eat meat is free of artificial ingredients.

19. A method for providing sliced ready-to-eat meat comprising:

a) slicing ready-to-eat meat in slices having a thickness of from about 0.5 to about 10 mm to provide sliced ready-to-eat meat;

b) disposing the sliced ready-to-eat meat into a flexible pouch component;

c) flushing the flexible pouch component with a modified atmosphere comprising an inert gas;

d) sealing the flexible pouch component to provide a sealed flexible pouch containing the sliced ready-to-eat meat and the inert gas; wherein the flexible pouch is formed from a polymeric multilayer film having:

i) a thickness of from about 0.2 mils to about 2 mils;

ii) a moisture vapor transmission rate (MVTR) of about 1.2 g/100 in²/24 Hrs at 100° F., 90% RH, and 1 atm or less;

iii) an $O_2$ Gas Transmission Rate of about 0.8 cc/100 sqin/day or less at 0.8 atmosphere, 0% relative humidity and 73° F.;

iv) a clarity of about 80% or greater; and v) a Gurley stiffness of 400 or less in milligrams (mg) force in each of its machine direction and transverse direction.

\* \* \* \* \*